United States Patent
Kobayashi et al.

(10) Patent No.: US 9,281,760 B2
(45) Date of Patent: Mar. 8, 2016

(54) POWER MODULE AND THREE-LEVEL POWER CONVERTER USING THE SAME

(75) Inventors: Tomohiro Kobayashi, Tokyo (JP); Yukio Nakashima, Tokyo (JP); Hideo Okayama, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/396,640

(22) PCT Filed: Apr. 26, 2012

(86) PCT No.: PCT/JP2012/061284
§ 371 (c)(1),
(2), (4) Date: Oct. 23, 2014

(87) PCT Pub. No.: WO2013/161045
PCT Pub. Date: Oct. 31, 2013

(65) Prior Publication Data
US 2015/0078052 A1   Mar. 19, 2015

(51) Int. Cl.
*H02M 7/537* (2006.01)
*H02M 7/487* (2007.01)

(52) U.S. Cl.
CPC .............. *H02M 7/537* (2013.01); *H02M 7/487* (2013.01)

(58) Field of Classification Search
CPC ..... H02M 1/32; H02M 3/33569; H02M 7/48; H02M 7/003; H02M 7/483; H02M 7/537
USPC ................................... 363/16, 55, 56.01, 131
See application file for complete search history.

(56) References Cited

U.S. PATENT DOCUMENTS

| 5,459,655 A | 10/1995 | Mori et al. |
| 5,731,970 A | 3/1998 | Mori et al. |
| 5,801,936 A | 9/1998 | Mori et al. |
| 5,929,519 A | 7/1999 | Mori et al. |

(Continued)

FOREIGN PATENT DOCUMENTS

| CA | 2400023 A1 * | 3/2002 | ............ H02M 7/487 |
| JP | 05-083947 A | 4/1993 | |

(Continued)

OTHER PUBLICATIONS

International Search Report (PCT/ISA/210) mailed on Jul. 31, 2012, by the Japanese Patent Office as the International Searching Authority for International Application No. PCT/JP2012/061284.

(Continued)

*Primary Examiner* — Adolf Berhane
(74) *Attorney, Agent, or Firm* — Buchanan Ingersoll & Rooney PC

(57) ABSTRACT

A first pair including a highest-outer-side switching element and a switching element that operates as a neutral clamp diode on a higher potential side, a second pair including a lowest-outer-side switching element and a switching element that operates as a neutral clamp diode on a lower potential side, and a third pair including a higher-inner-side switching element and a lower-inner-side switching element are respectively configured from power modules that are two-element-inclusive power modules, a power conversion circuit portion being configured from the first pair, the second pair, and the third pair.

5 Claims, 8 Drawing Sheets

(56) References Cited

U.S. PATENT DOCUMENTS

| | | | |
|---|---|---|---|
| 6,353,547 B1* | 3/2002 | Jang et al. | 363/132 |
| 7,091,690 B1* | 8/2006 | Oka et al. | 318/727 |
| 8,111,530 B2 | 2/2012 | Ono et al. | |
| 2011/0267862 A1* | 11/2011 | Roesner et al. | 363/132 |
| 2012/0018777 A1* | 1/2012 | Takizawa | 257/140 |
| 2012/0218785 A1* | 8/2012 | Li et al. | 363/21.12 |
| 2015/0222201 A1* | 8/2015 | Nakashima | H02M 7/537 363/131 |

FOREIGN PATENT DOCUMENTS

| | | |
|---|---|---|
| JP | 05-211776 A | 8/1993 |
| JP | 05-227763 A | 9/1993 |
| JP | 11-243689 A | 9/1999 |
| JP | 2006-246576 A | 9/2006 |
| JP | 2009-017642 A | 1/2009 |
| JP | 2009-232621 A | 10/2009 |
| JP | 2011-234544 A | 11/2011 |
| JP | 2012-029516 A | 2/2012 |
| JP | 2012-039866 A | 2/2012 |
| WO | WO 2008/075418 A1 | 6/2008 |

OTHER PUBLICATIONS

Written Opinion (PCT/ISA/237) mailed on Jul. 31, 2012, by the Japanese Patent Office as the International Searching Authority for International Application No. PCT/JP2012/061284.

Office Action (Notice of Rejection) mailed on Jun. 25, 2013, by the Japanese Patent Office in corresponding Japanese Patent Application No. 2013-516821, and an English Translation of the Office Action. (5 pages).

Office Action (Notice of Rejection) mailed on Oct. 22, 2013, by the Japanese Patent Office in corresponding Japanese Patent Application No. 2013-516821, and an English Translation of the Office Action. (4 pages).

* cited by examiner (a)

(b)

(c)

(a)

(b)

POWER MODULE AND THREE-LEVEL POWER CONVERTER USING THE SAME

FIELD

The present invention relates to a power module and a three-level power converter using the same.

BACKGROUND

Conventional three-level power converters for railroad vehicles using two-element-inclusive power modules are configured such that, among four switching elements that are connected in series and from which upper and lower arms are configured, the combination of the outer-side switching elements (the switching element located on the highest potential side and the switching element located on the lowest potential side) and the combination of the inner-side switching elements (two switching elements located in the middle) are each configured from a two-element-inclusive power module and clamp diodes connected between the connection point of the two switching elements from which the upper arm is configured and the connection point of the two switching elements from which the lower arm is configured are configured separately by using a diode module (for example, Patent Literature 1 described below).

CITATION LIST

Patent Literature

Patent Literature 1: WO2008/075418

SUMMARY

Technical Problem

As described above, in the conventional three-level power converters for railroad vehicles using two-element-inclusive power modules, the combination of the outer-side switching elements and the combination of the inner-side switching elements are each configured from a two-element-inclusive power module. Therefore, the low-inductance structure in the module does not sufficiently contribute as a low-inductance circuit necessary for three-level power converters for railroad vehicles. Consequently, there is a problem in that the characteristics of the two-element-inclusive power modules cannot be sufficiently exerted.

The present invention has been achieved in view of the above and an object of the present invention is to provide a power module capable of sufficiently exerting the characteristics of the two-element-inclusive power modules and a three-level power converter using the same.

Solution to Problem

In order to solve the above problems and achieve the object, the present invention relates to a three-level power converter, wherein a first pair including an outer-side switching element on a highest potential side and a neutral clamp diode on a higher potential side, a second pair including a switching element on a lowest potential side and a neutral clamp diode on a lower potential side, and a third pair including an inner-side switching element on a higher side and an inner-side switching element on a lower side are each configured from a two-element-inclusive power module, a power conversion circuit portion being configured from the first pair, the second pair, and the third pair.

Advantageous Effects of Invention

According to the present invention, an effect is obtained where it is possible to provide a power module capable of sufficiently exerting the characteristics of the two-element-inclusive power modules and a three-level power converter using the same.

DESCRIPTION OF EMBODIMENTS

A power module and a three-level power converter according to embodiments of the present invention will be explained below with reference to the accompanying drawings. The present invention is not limited to the following embodiments.

First Embodiment

Figure 1:
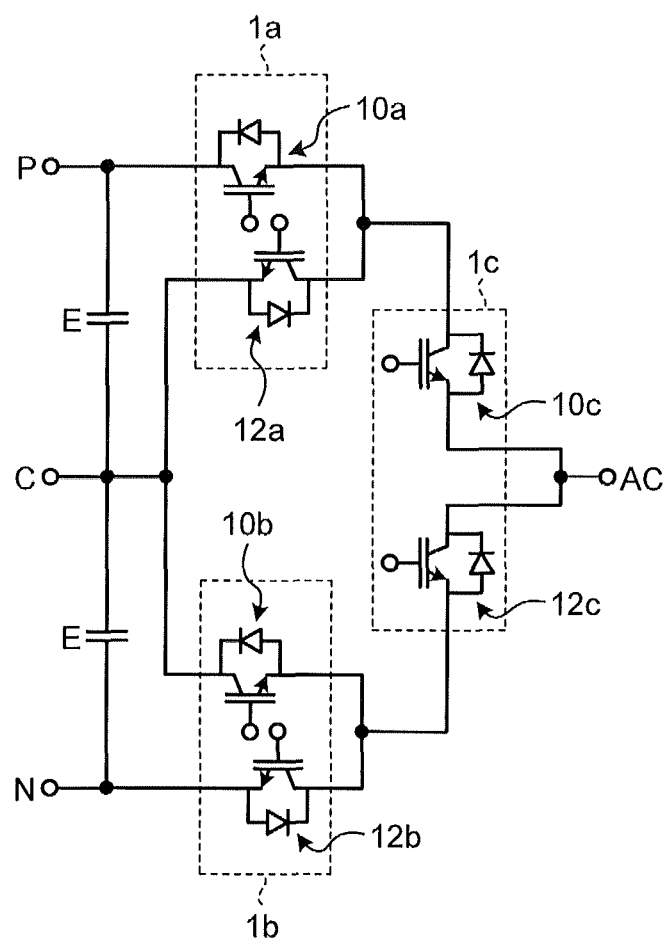
FIG. 1 is a partial circuit diagram of a three-level power converter according to a first embodiment.

FIG. 1 is a partial circuit diagram of a power converter according to a first embodiment of the present invention and illustrates the configuration of a DC circuit portion and part of a power conversion circuit portion in a three-level power converter preferably used in a railroad vehicle. As illustrated in FIG. 1, the three-level power converter is provided with three two-element-inclusive four-terminal power modules 1a to 1c. Specifically, in the configuration of the three-level power converter, a switching element 10a located on the outer side of the highest potential side and a switching element 12a that operates as a neutral clamp diode on the higher potential side are paired as a first pair; a switching element 12b located on the outer side of the lowest potential side and a switching element 10b that operates as a neutral clamp diode on the lower potential side are paired as a second pair; and two inner-side switching elements 10c and 12c located in the middle are paired as a third pair. The first pair is configured from the two-element-inclusive four-terminal power module 1a; the second pair is configured from the two-element-inclusive four-terminal power module 1b; and the third pair is configured from the two-element-inclusive four-terminal power module 1c. The switching elements 12a and 10b are each a switching element that is always off and functions only as a diode (in other words, a unidirectional element).

Figure 2:
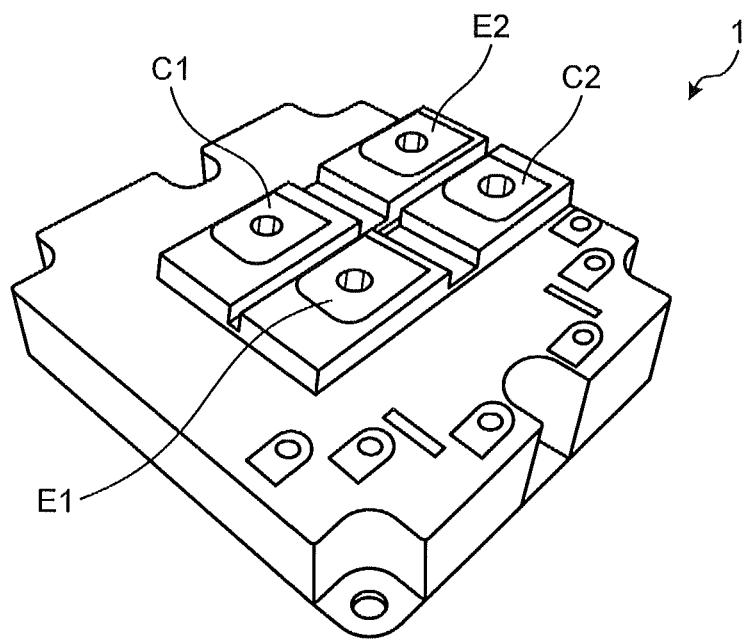
FIG. 2 is a perspective view of the schematic shape of a power module according to the first embodiment configured as a two-element-inclusive power module.

Next, an explanation will be given of the two-element-inclusive power module used in the three-level power converter in the first embodiment. FIG. 2 is a perspective view of the schematic shape of the power module according to the first embodiment configured as a two-element-inclusive power module and FIG. 3 is a circuit diagram of the two-element-inclusive power module illustrated in FIG. 2.

Figure 3:
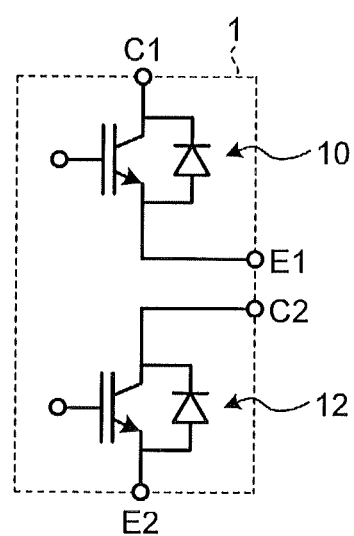
FIG. 3 is a circuit diagram of the two-element-inclusive power module illustrated in FIG. 2.

As illustrated in FIG. 2 and FIG. 3, a two-element-inclusive power module 1 according to the first embodiment is such that a first element pair 10 and a second element pair 12, which are two element pairs in each of which an IGBT as a switching element and a diode that is referred to as a flywheel diode (hereinafter, described as "FWD") are connected in anti-parallel with each other, are housed in a package.

In FIG. 2 and FIG. 3, the first element pair 10 is configured such that the collector of the IGBT and the cathode of the FWD are electrically connected to each other in the module and the connection end thereof is led out to be connected to a collector first electrode C1 provided on the upper surface of the two-element-inclusive power module 1, and the emitter of the IGBT and the anode of the FWD are electrically connected to each other in the module and the connection end thereof is led out to be connected to an emitter first electrode E1 provided on the upper surface of the two-element-inclusive power module 1. In a similar manner, the second element pair 12 is configured such that the collector of the IGBT and the cathode of the FWD are electrically connected to each other in the module and the connection end thereof is led out to be connected to a collector second electrode C2 provided on the upper surface of the two-element-inclusive power module 1, and the emitter of the IGBT and the anode of the FWD are electrically connected to each other in the module and the connection end thereof is led out to be electrically connected to an emitter second electrode E2 provided on the upper surface of the two-element-inclusive power module 1.

As is apparent from the structure in FIG. 2 and the circuit configuration in FIG. 3, it is possible to configure a leg in which the first element pair 10 and the second element pair 12 are connected in series by electrically connecting the emitter first electrode E1 and the collector second electrode C2 of the two-element-inclusive power module 1 by using a conductor bar, a laminated bus bar, or the like.

Figure 4:
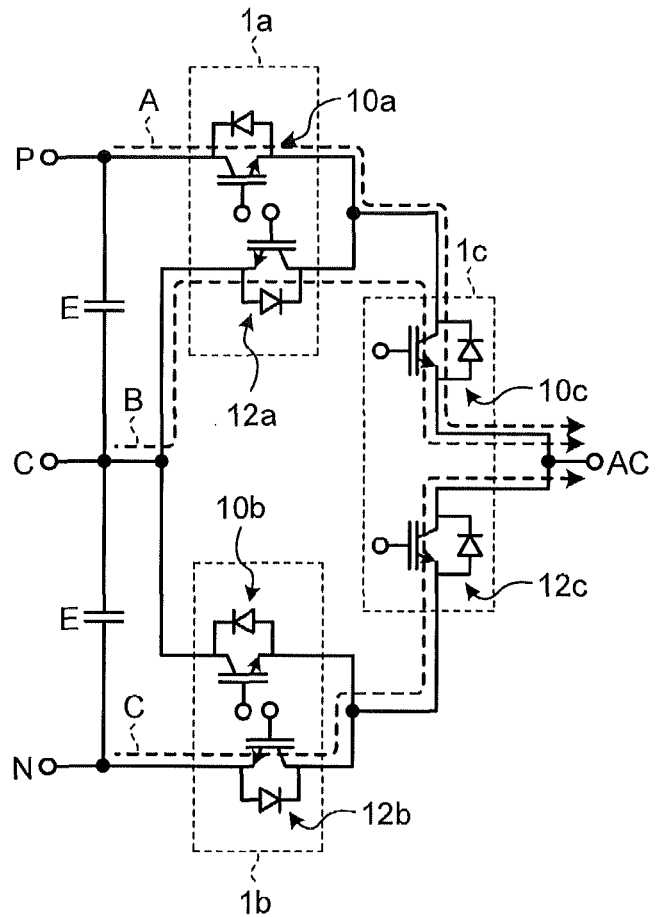
FIG. 4 is an explanatory diagram for explaining the operation of the three-level power converter according to the first embodiment.

Next, on explanation will be given of the operation of the three-level power converter according to the first embodiment with reference to FIG. 4. FIG. 4 is an explanatory diagram for explaining the operation of the three-level power converter according to the first embodiment and illustrates the circuit diagram in FIG. 1 with the inclusion of current paths. In the following explanation, a case is explained as an example where the current output from the AC end forming an alternating-current end of the three-level power converter is positive (right direction).

First, when the switching element (hereinafter, referred to as the "highest-outer-side switching element") 10a located on the outer side of the highest potential side and the switching element (hereinafter, referred to as the "higher-inner-side switching element") 10c located on the inner side of the higher side are, on and the switching element (hereinafter, referred to as the "lowest-outer-side switching element") 12b located on the outer side of the lowest-potential side and the switching element (hereinafter, referred to as the "lower-inner-side switching element") 12c located on the inner side of the lower side are off, the current from a higher-side DC end P flows to the highest-outer-side switching element 10a and the higher-inner-side switching element 10c and is output to the AC end (current path A).

Next, when the highest-outer-side switching element 10a is turned off, the current from an intermediate potential end C flows to the higher-inner-side switching element 10c through the switching element 12a (the neutral clamp diode on the higher potential side) and is output to the AC end (current path B). Even when the lower-inner-side switching element 12c is turned on, the current path does not change. However, when the higher-inner-side switching element 10c is turned off, a current from the lower-side DC end N flows to the lowest-outer-side switching element 12b and the lower-inner-side switching element 12c and is output to the AC end (current path C).

As described above, the on/off states of the highest-outer-side switching element 10a, the lowest-outer-side switching element 12b, the higher-inner-side switching element 10c, and the lower-inner-side switching element 12c change as follows: the highest-outer-side switching element 10a: ON, the higher-inner-side switching element 10c: ON, the lower-inner-side switching element 12c: OFF, and the lowest-outer-side switching element 12b: OFF→the highest-outer-side switching element 10a: OFF, the higher-inner-side switching element 10c: ON, the lower-inner-side switching element 12c: OFF, and the lowest-outer-side switching element 12b: OFF→the highest-outer-side switching element 10a: OFF, the higher-inner-side switching element 10c: ON, the lower-inner side switching element 12c: ON, and the lowest-outer-side switching element 12b: OFF→the highest-outer-side switching element 10a: OFF, the higher-inner-side switching element 10c: OFF, the lower-inner-side switching element 12c: ON, and the lowest-outer-side switching element 12b: OFF→the highest-outer-side switching element 10a: OFF, the higher-inner-side switching element 10c: OFF, the lower-inner-side switching element 12c: ON, and the lowest-outer-side switching element 12b: ON→the highest-outer-side switching element 10a: OFF, the higher-inner-side switching element 10c: OFF, the lower-inner-side switching element 12c: ON, and the lowest-outer-side switching element 12b: OFF→ . . . .

At this point, when both the positive and negative currents due to the current flowing out of the AC end and the current flowing into the AC end are taken into consideration, these currents commutate between the highest-outer-side switching element 10a and the switching element 12a, between the higher-inner-side switching element 10c and the lower-inner-side switching element 12c, and between the lowest-outer-side switching element 12b and the switching element 10b. Therefore, in the three-level power converter in the first embodiment, power modules each including two elements that can be configured to have a low inductance by being housed in a module are configured by combining the highest-outer-side switching element 10a and the switching element 12a, combining the higher-inner-side switching element 10c and the lower-inner-side switching element 12c, and combining the lowest-outer-side switching element 12b and the switching element 10b. With such a configuration, an effect can be obtained where the low-inductance circuit in the power module contributes to the low-inductance circuit necessary for the three-level power converter for a railroad vehicle.

As described above, the three-level power converter according to the first embodiment is configured from the two-element-inclusive four-terminal power modules in each of which a higher potential electrode and a lower potential electrode of one element and a higher potential electrode and a lower potential electrode of the other element in the two-element-inclusive power module are each led out. Therefore, an effect is obtained where the three-level power converter for a railroad vehicle can be configured from one type of power module.

In the configuration of the DC circuit portion of the three-level power converter, for example, when the intermediate potential end C is a ground point, if the switching state of each switching element changes, the highest-outer-side switching element 10*a* and the switching element 12*a* only alternate between a potential P and a potential C, the higher-inner-side switching element 10*c* and the lower-inner-side switching element 12*c* only alternate between the potential P and the potential C or between the potential C and a potential N, and the lowest-outer-side switching element 12*b* and the switching element 10*b* only alternate between the potential C and the potential N; therefore, it is satisfactory that the power modules 1*a* to 1*c* have a ground dielectric withstand voltage with respect to a voltage E. Therefore, according to the three-level power converter in the first embodiment, an effect is obtained where the three-level power converter can be configured from power modules having a small ground dielectric withstand voltage with respect to the voltage corresponding to half the voltage of the DC circuit portion.

Moreover, it is obvious that the two-element-inclusive power module 1 described above can also be used for a two-level power converter. Therefore, according to the three-level power converter in the first embodiment, an effect is obtained where the three-level power converter for a railroad vehicle can be configured from one type of power module that can also be used for a two-level power converter.

Second Embodiment

Figure 5:
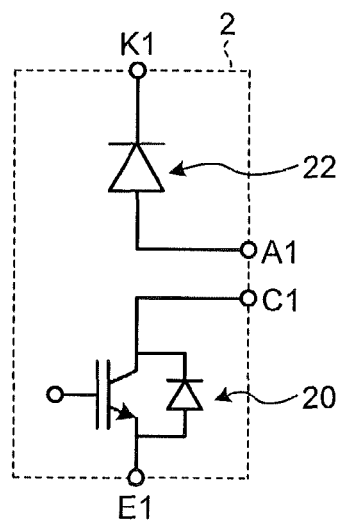
FIG. 5 is a circuit diagram of a two-element-inclusive power module used in a second embodiment.
Figure 6:
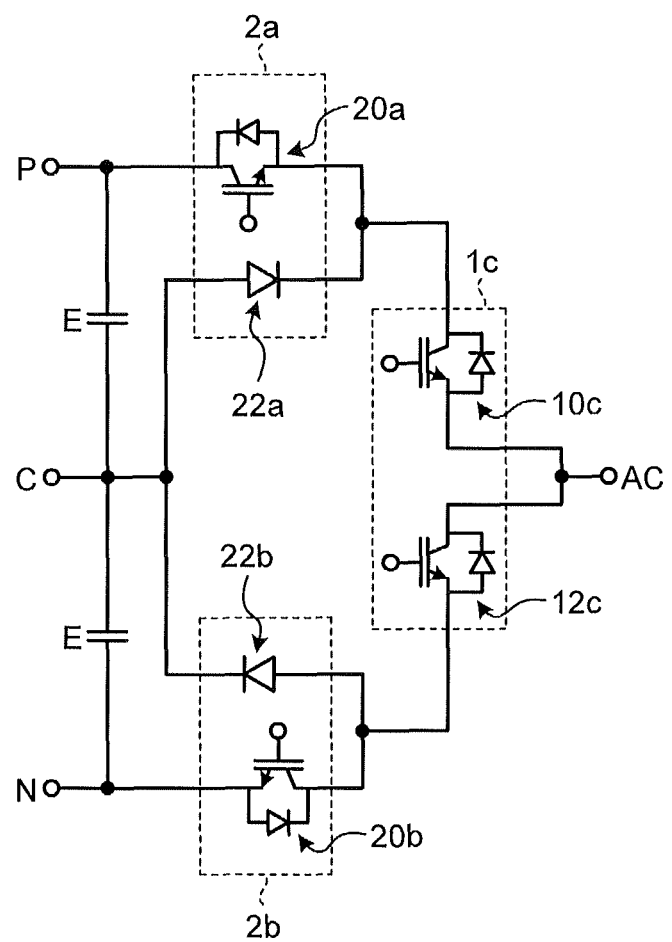
FIG. 6 is a partial circuit diagram of a three-level power converter according to the second embodiment.

FIG. 5 is a circuit diagram of a two-element-inclusive power module used in a second embodiment and FIG. 6 is a partial circuit diagram of a three-level power converter according to the second embodiment. In the three-level power converter according to the first embodiment, all of the power modules 1*a* to 1*c* from which the three-level power converter is configured are configured from the same power modules 1 (see FIG. 2) by employing the embodiment in which the switching element 12*a* in the power module 1*a* and the switching element 10*b* in the power module 1*b* are always off. In contrast, the three-level power converter in the second embodiment is configured from the power module 1 illustrated in FIG. 2 and power modules 2 illustrated in FIG. 5.

As illustrated in FIG. 5, the power module 2 is configured to include a first element pair 20 and a second element 22. The first element pair 20 is such that the collector of the IGBT and the cathode of the FWD are electrically connected to each other in the module and the connection end thereof is led out to form a collector electrode C1, and the emitter of the IGBT and the anode of the FWD are electrically connected to each other in the module and the connection end thereof is led out to form an emitter electrode E1. In contrast to the configuration in FIG. 2, the second element 22 is provided with only a diode. In the second element 22, the cathode of the diode is led out to form a cathode electrode K1 and the anode of the diode is led out to form an anode electrode A1. In the configuration in FIG. 5, the positions at which the electrodes are led out are for the sake of convenience and are not limited to these leading-out positions in FIG. 5.

The power converter that drives a motor includes a brake chopper circuit in some cases and the power module illustrated in FIG. 5 has a configuration that can be used for a brake chopper. In other words, the three-level power converter according to the second embodiment has a configuration in which a power module for a brake chopper can also be used. The three-level power converter according to the second embodiment is configured such that the power module 1*c* including the higher-inner-side switching element 10*c* and the lower-inner-side switching element 12*c* is configured from the power module 1 in FIG. 2, and a highest-outer-side switching element 20*a* and a neutral clamp diode 22*a* on the higher potential side and a lowest-outer-side switching element 20*b* and a neutral clamp diode 22*b* on the lower potential side are respectively configured from the power modules 2 in FIG. 5.

According to the three-level power converter in the second embodiment, instead of making the switching element connected in anti-parallel always off, the switching element is omitted and only a diode is provided; therefore, it is possible to use a neutral clamp diode that has a larger capacity than that in the first embodiment and the configuration is simplified. Accordingly, an effect is obtained where reliability is improved and the cost and size are reduced.

Moreover, according to the three-level power converter in the second embodiment, the power module that can also be used for a two-level power converter can be used and the power module that can also be used for a brake chopper circuit can also be used. Accordingly, an effect is obtained where the necessary number of types of power module can be reduced.

Third Embodiment

Figure 7:
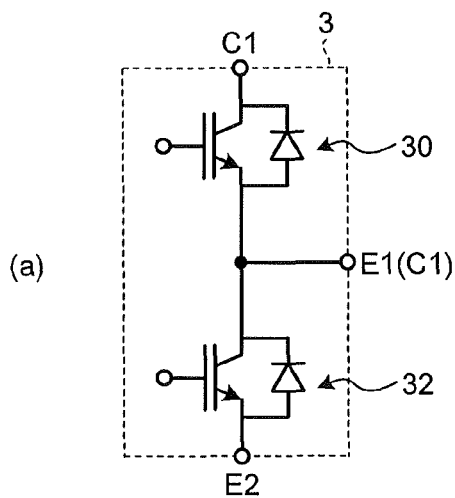
FIG. 7 is a diagram of types of circuit configuration of two-element-inclusive power modules used in third and fourth embodiments.
Figure 7:
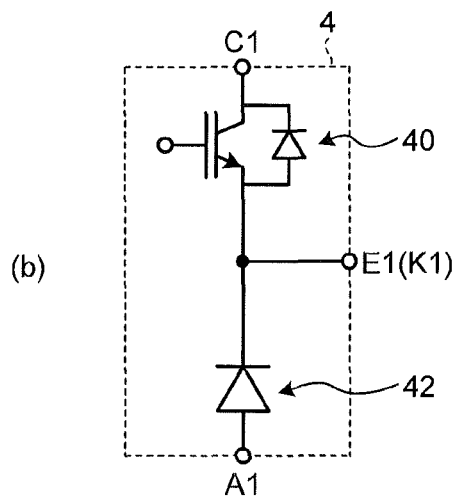
Figure 7:
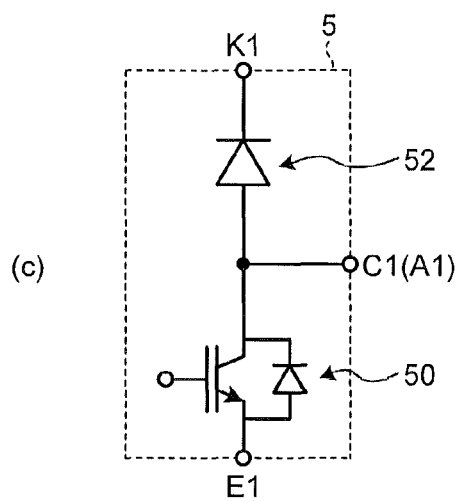

FIG. 7 is a diagram of types of circuit configuration of the two-element-inclusive power modules used in third and fourth embodiments. More specifically, FIG. 7(*a*) illustrates a two-element-inclusive power module used in the three-level power converters in the third and fourth embodiments and FIGS. 7(*b*) and 7(*c*) illustrate two-element-inclusive power modules used only in the fourth embodiment. The two-element-inclusive elements in FIGS. 7(*b*) and 7(*c*) will be explained in a section about the fourth embodiment.

As illustrated in FIG. 7 (*a*), a power module 3 is configured to include a first element pair 30 and a second element pair 32. The first element pair 30 is such that the collector of the IGBT and the cathode of the FWD are electrically connected to each other in the module and the connection end thereof is led out to form a collector electrode C1, and the emitter of the IGBT and the anode of the FWD are electrically connected to each other in the module and the connection end thereof is led out to form an emitter electrode E1. The second element pair 32 is such that the emitter of the IGBT and the anode of the FWD are electrically connected to each other in the module and the connection end thereof is led out to form an emitter electrode 52, and the collector of the IGBT and the cathode of the FWD are connected to the emitter of the IGBT in the first element pair 30 in the module. With such a configuration, the collector electrode C1 of the second element pair 32 matches the emitter electrode E1. The positions at which the electrodes are led out are for the sake of convenience and are not limited to these leading-out positions in FIG. 7.

Figure 8:
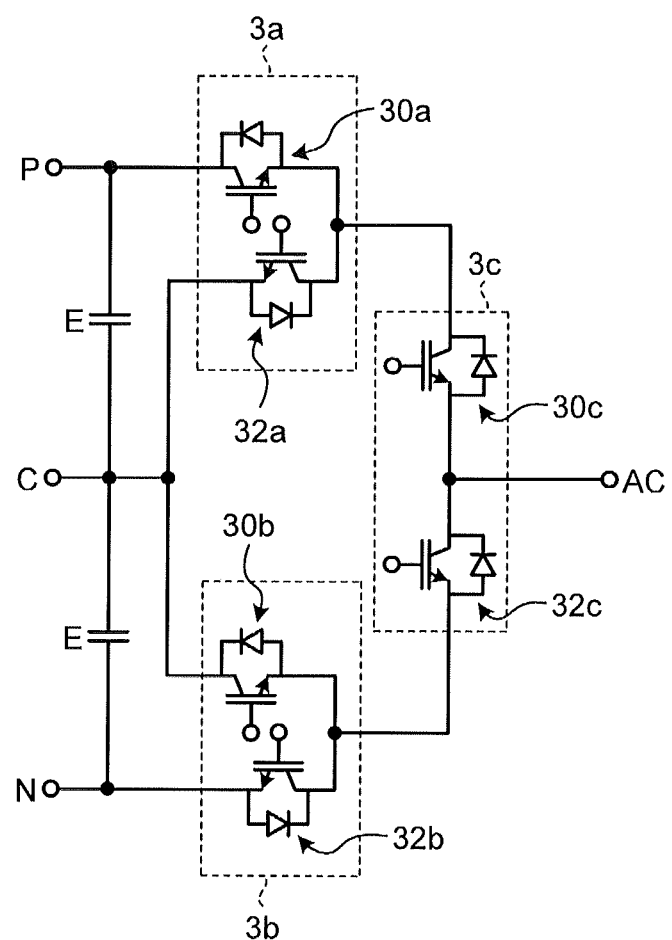
FIG. 8 is a partial circuit diagram of a three-level power converter according to the third embodiment.

FIG. 8 is a partial circuit diagram of the three-level power converter according to the third embodiment. In the three-level power converter according to the first embodiment, the power modules 1*a* to 1*c* are each configured from a four-terminal module as illustrated in FIG. 3. In the three-level power converter according to the third embodiment, power modules are each configured from a three-terminal module as illustrated in FIG. 7(*a*). Specifically, a power module 3*a* including a highest-outer-side switching element 30*a* and a switching element 32a that operates as a neutral clamp diode on the higher potential side, a power module 3b including a lowest-outer-side switching element 32b and a switching element 30b that operates as a neutral clamp diode on the lower potential side, and a power module 3c including a higher-inner-side switching element 30c and a lower-inner-side switching element 32c are each configured from the power module 3 illustrated in FIG. 7(a).

According to the three-level power converter in the third embodiment, it is not necessary to perform electrical connection between the highest-outer-side switching element 30a and the switching element 32a, between the lowest-outer-side switching element 32b and the switching element 30b, and between the higher-inner-side switching element 30c and the lower-inner-side switching element 32c outside the power modules. Accordingly, an effect is obtained where a circuit having a lower inductance than that in the first embodiment can be obtained.

Figure 9:
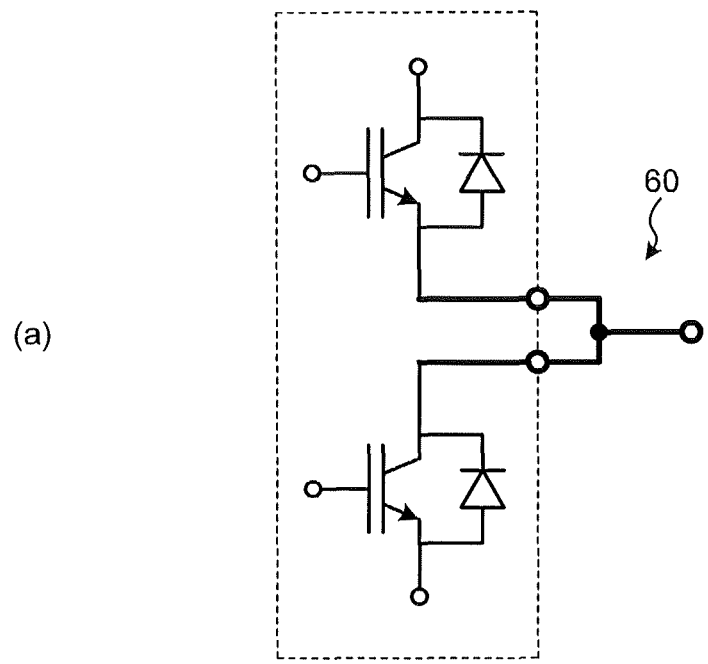
FIG. 9 is a diagram schematically illustrating the external connection structure in a case of a two-element-inclusive four-terminal power module.
Figure 9:
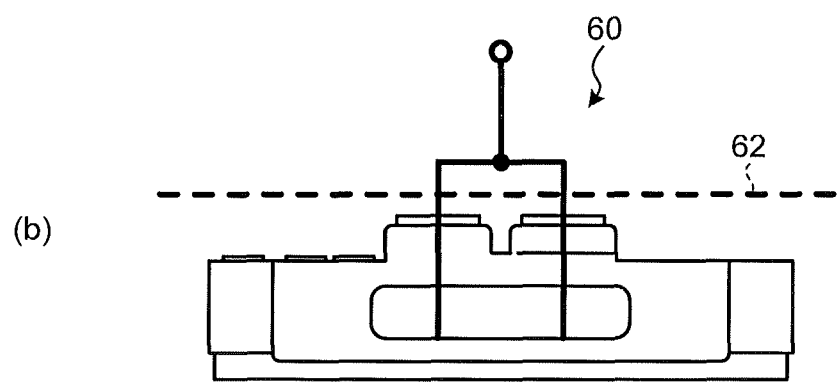

FIG. 9 is a diagram schematically illustrating the external connection structure in a case of a two-element-inclusive four-terminal power module. When the two-element-inclusive four-terminal power module is used, it is necessary to configure an AC terminal portion 60 by having an external connection; therefore, the AC terminal portion 60 and a PN connection conductor (a DC line for connecting the DC circuit portion and each switching element) 62 compete for a space. In such a case, for example, as illustrated in FIG. 9(b), when wiring is performed such that the PN connection conductor 62 is avoided, the connection conductor necessarily becomes long and an increase in inductance is inevitable. In contrast, as in the third embodiment, when the power modules 3a to 3c are each configured from a two-element-inclusive three-terminal power module, an increase in length of the connection conductor of the AC terminal portion 60 can be suppressed and thus a significant effect is obtained in terms of reduction of the inductance.

Fourth Embodiment

Figure 10:
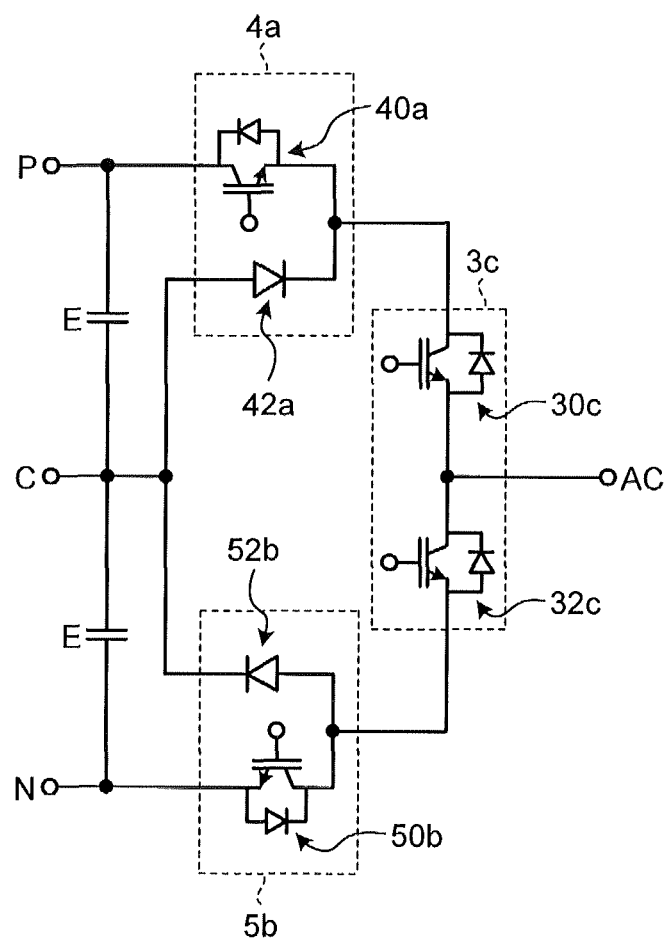
FIG. 10 is a partial circuit diagram of a three-level power converter according to the fourth embodiment.

FIG. 10 is a partial circuit diagram of the three-level power converter according to the fourth embodiment. In the three-level power converter according to the third embodiment, the configuration is such that two-element-inclusive three-terminal power modules are used and all of the power modules 3a to 3c from which the three-level power converter is configured are configured from the same power modules 3 (see FIG. 7(a)) by employing the embodiment in which the switching element 32a in the power module 3a and the switching element 30b in the power module 3b are always off. In contrast, the three-level power converter in the fourth embodiment is configured from a power module 4 illustrated in FIG. 7(b) and a power module 5 illustrated in FIG. 7(c) in addition to the power module 3 illustrated in FIG. 7(a).

As illustrated in FIG. 7(b), the power module 4 is configured to include a first element pair 40 and a second element 42. The first element pair 40 is such that the collector of the IGBT and the cathode of the FWD are electrically connected to each other in the module and the connection end thereof is led out to form a collector electrode C1, and the emitter of the IGBT and the anode of the FWD are electrically connected to each other in the module and the connection end thereof is led out to form an emitter electrode E1. In contrast, in a similar manner to the case in FIG. 5, the second element 42 is provided with only a diode. In the second element 42, the anode of the diode is led out to form an anode electrode A1, and the cathode of the diode is connected to the emitter of the IGBT in the first element pair 40 in the module. With such a configuration, the cathode electrode K1 matches the emitter electrode E1. The positions at which the electrodes are led out are for the sake of convenience and are not limited to these leading-out positions in FIG. 7(b).

In a similar manner, as illustrated in FIG. 7(c), the power module 5 is configured to include a first element pair 50 and a second element 52. The first element pair 50 is such that the collector of the IGBT and the cathode of the FWD are electrically connected to each other in the module and the connection end thereof is led out to form a collector electrode C1, and the emitter of the IGBT and the anode of the FWD are electrically connected to each other in the module and the connection end thereof is led out to form an emitter electrode E1. In contrast, in a similar manner to the case in FIG. 7(b), the second element 52 is provided with only a diode. In the second element 52, the cathode of the diode is led out to form a cathode electrode K1, and the anode of the diode is connected to the collector of the IGBT in the first element pair 50 in the module. With such a configuration, the anode electrode A1 matches the collector electrode C1. The positions at which the electrodes are led out are for the sake of convenience and are not limited to these leading-out positions in FIG. 7(c).

Although it is explained in a section about the second embodiment, the power converter that drives a motor includes a brake chopper circuit in some cases and the power modules illustrated in FIGS. 7(b) and 7(c) each have a configuration that can be used for a brake chopper. In other words, the three-level power converter according to the fourth embodiment has a configuration in which a power module for a brake chopper can also be used. The three-level power converter according to the fourth embodiment is configured such that the power module 3c including the higher-inner-side switching element 30c and the lower-inner-side switching element 32c is configured from the power module 3 illustrated in FIG. 7(a); a highest-outer-side switching element 40a and a neutral clamp diode 42d on the higher potential side are configured from the power module 4 illustrated in FIG. 7(b); and a lowest-outer-side switching element 50b and a neutral clamp diode 52b on the lower potential side are configured from the power module 5 illustrated in FIG. 7(c).

According to the three-level power converter in the fourth embodiment, instead of making the switching element connected in anti-parallel always off, the switching element is omitted and only a diode is provided; therefore, it is possible to use a neutral clamp diode that has a larger capacity than that in the third embodiment and the configuration is simplified. Accordingly, an effect is obtained where reliability is improved compared with the third embodiment and the cost and size are reduced.

Moreover, according to the three-level power converter in the fourth embodiment, the power module that can also be used for a two-level power converter can be used and the power module that can also be used for a brake chopper circuit can be also used. Accordingly, an effect is obtained where the necessary number of types of power module can be reduced.

Moreover, the three-level power converter according to the fourth embodiment is configured from the two-element-inclusive three-terminal power modules in each of which a higher potential electrode of one element and a lower potential electrode of the other element in the two-element-inclusive power module are led out to form first and second terminals, respectively, and a lower potential electrode of one element and a higher potential electrode of the other element are connected to form a common terminal. Therefore, it is not necessary to connect the portions to be a common terminal outside the power module. Accordingly, an effect is obtained where a circuit having a lower inductance than that in the third embodiment can be obtained.

Fifth Embodiment

As large-capacity power modules that are used in power converters for railroad vehicles, for example, 3300V/1500 A, 4500V/1200 A, and 6500V/750 A rated power modules are power modules that are available and have the greatest capacities. Such power modules have a basic size of 140 mm×190 mm due to constraints, such as bolt mounting and control of the flatness of the cooling surface; therefore, currently, the power modules are all configured as a one-element-inclusive power module. In this manner, the power devices having the greatest capacities are configured, due to mechanical constraints, to include one element. Therefore, in order to easily realize the three-level power converters according to the first to fourth embodiments, it is desirable to use intermediate-capacity power modules.

In the fifth embodiment, for example, wide bandgap semiconductors, such as SiC and GaN, are used as a semiconductor material with which the power modules according to the first to fourth embodiments are realized. By using wide bandgap semiconductors, the losses generated can be reduced, and in the case of the power modules having the same current rating, the power module can be reduced in size compared with the case of using narrow bandgap semiconductors, such as Si. In other words, if wide bandgap semiconductors are used as a semiconductor material for forming the power modules according to the first to fourth embodiments, for example, even in the case of configuring a large-capacity power converter for a railroad vehicle, it can be configured from two-element-inclusive power modules. Therefore, the control of the flatness of a cooling device becomes easy and thus an effect is obtained where workability is improved.

The configurations illustrated in the above first to fifth embodiments are examples of the configuration of the present invention and it is obvious that the configurations can be combined with other publicly known technologies and the configurations can be variously changed without departing from the scope of the present invention.

Furthermore, in the above embodiments, the content of the invention is explained targeting a DC-DC converter that is assumed to be used in the field of electric railroads. However, fields of application are not limited to this and it is obvious that the present invention can be applied to industrial applications in various fields (such as for electrical power systems and machine tools).

INDUSTRIAL APPLICABILITY

As described above, the present invention is useful as a power module and a three-level power converter that can sufficiently exert characteristics as a two-element-inclusive power module.

REFERENCE SIGNS LIST 1, 1a to 1c, 2, 3, 3a to 3c, 4, 5 power module
10, 20, 30, 40, 50 first element pair
12, 32 second element pair
22, 42, 52 second element
10a, 20a, 30a, 40a highest-outer-side switching element
12b, 20b, 32b, 50b lowest-outer-side switching element
10c, 30c higher-inner-side switching element
12c, 32c lower-inner-side switching element
12a, 32a switching element that operates as a neutral clamp diode on the higher potential side
10b, 30b switching element that operates as a neutral clamp diode on the lower potential side
22a, 22b, 42a, 52b neutral clamp diode
60 AC terminal portion
62 PN connection conductor

The invention claimed is:

1. A three-level power converter, comprising a first pair including an outer-side switching element on a highest potential side and a neutral clamp diode on a higher potential side, a second pair including an outer-side switching element on a lowest potential side and a neutral clamp diode on a lower potential side, and a third pair including an inner-side switching element on a higher potential side and an inner-side switching element on a lower potential side, wherein
  all of the first pair, the second pair and the third pair are each configured from a two-element-inclusive power module having at least one pair of a diode and switching element, in each of which the diode and the switching element are connected in anti-parallel with each other, a power conversion circuit portion is configured from the first pair, the second pair, and the third pair,
  a first switching state is such that the outer-side switching element on the highest potential side and the inner-side switching element on the higher potential side are on and the inner-side switching element on the lower potential side and the outer-side switching element on the lowest potential side are off,
  a second switching state is such that the inner-side switching element on the higher potential side and the inner-side switching element on the lower potential side are on and the outer-side switching element on the highest potential side and the outer-side switching element on the lowest potential side are off,
  a third switching state is such that the inner-side switching element on the lower potential side and the outer-side switching element on the lowest potential side are on and the outer-side switching element on the highest potential side and the inner-side switching element on the higher potential side are off,
  switching is performed between the first switching state and the second switching state or between the second switching state and the third switching state,
  the switching element in the two-element-inclusive power module is formed of a wide bandgap semiconductor, and
  each of the first pair, the second pair and the third pair are housed in a separate package.

2. The three-level power converter according to claim 1, wherein
  the two-element-inclusive power module from which the first to third pairs are configured is a two-element-inclusive four-terminal power module from which a higher potential electrode and a lower potential electrode of one element pair and a higher potential electrode and a lower potential electrode of another element pair are each led out.

3. The three-level power converter according to claim 1, wherein
  the two-element-inclusive power module from which the first to third pairs are configured is a two-element-inclusive three-terminal power module from which a higher potential electrode of one element pair, a lower potential electrode of another element pair, and a connection end of a lower potential electrode of the one element pair and the higher potential electrode of the another element pair are each led out.

4. The three-level power converter according to claim 1, wherein
    switching is performed between the first switching state and the second switching state via a fourth switching state in which the inner-side switching element on the higher potential side is on and the outer-side switching element on the highest potential side, the inner-side switching element on the lower potential side, and the outer-side switching element on the lowest potential side are off, and
    switching is performed between the second switching state and the third switching state via a fifth switching state in which the inner-side switching element on the lower potential side is on and the outer-side switching element on the highest potential side, the inner-side switching element on the higher potential side, and the outer-side switching element on the lowest potential side are off.

5. The three-level power converter according to claim 4, wherein the wide bandgap semiconductor is a semiconductor using silicon carbide, gallium nitride material, or diamond.

* * * * *